3,322,138
PACKINGLESS IN-LINE VALVE
William O. Backman, P.O. Box 158,
Fair Oaks, Calif. 95628
Filed June 1, 1964, Ser. No. 371,528
3 Claims. (Cl. 137—219)

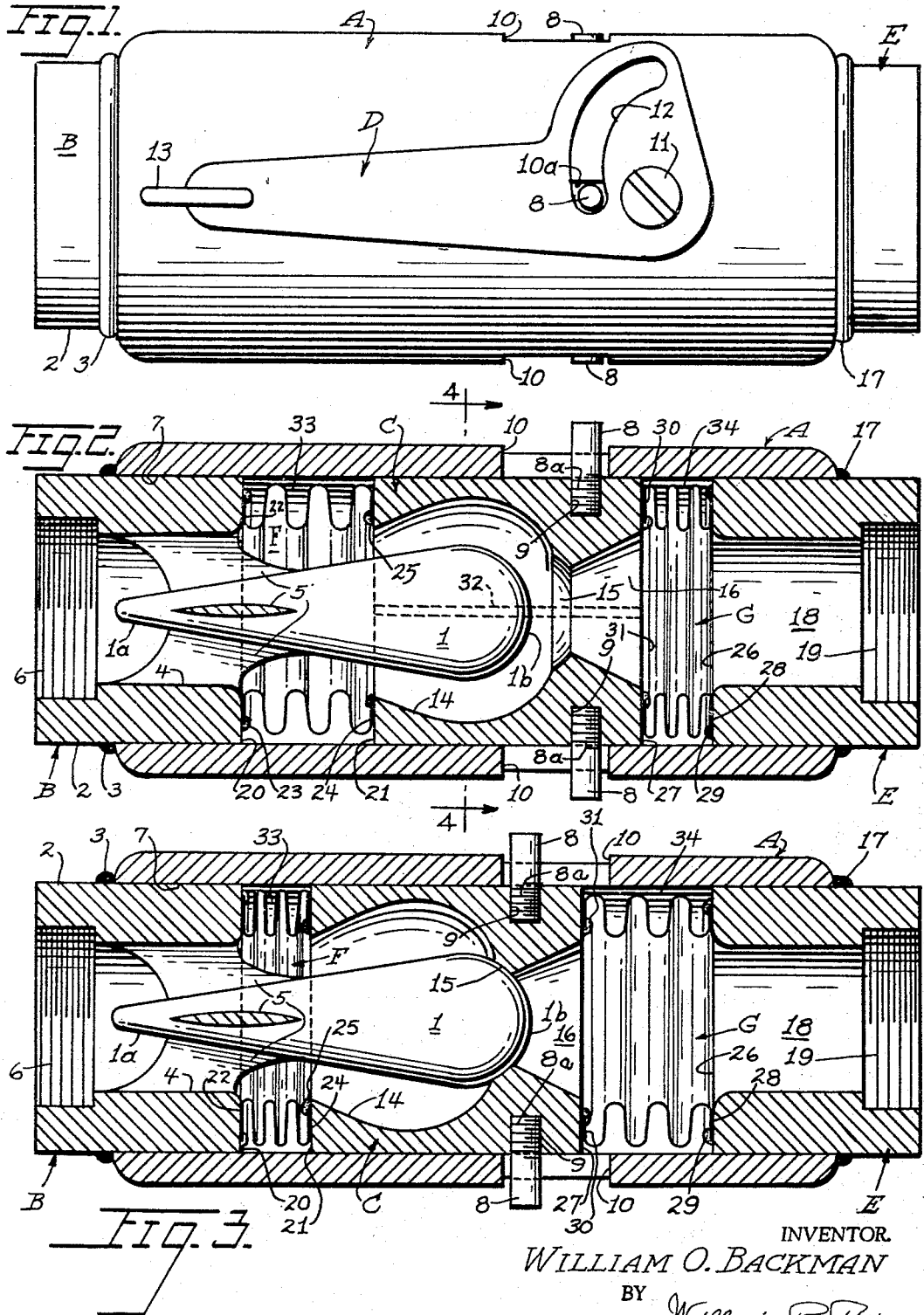

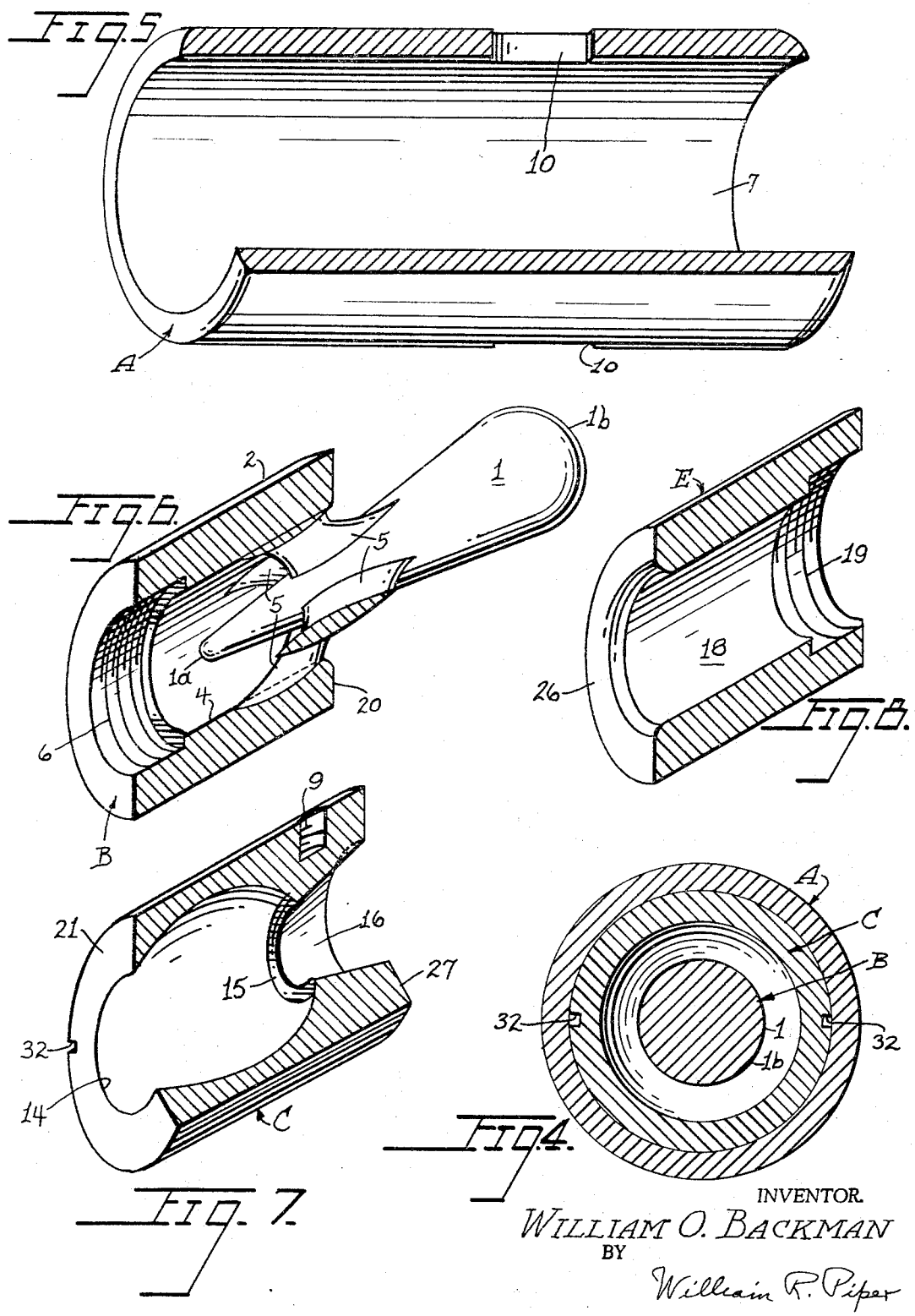

The present invention relates to improvements in a packingless in-line valve, and it consists in the combination, construction and arrangement of parts as hereinafter described and claimed.

An object of my invention is to provide an improvement over existing hermetically sealed, packingless in-line valves.

In the present invention I show an in-line valve in which the outer valve housing is substantially of the same diameter as the pipe or conduit to which it is connected. All of the working parts of the valve are concealed within the valve housing and I obviate the necessity of causing any stem to extend from the inside of the valve through the valve housing to an exterior part thereof. This eliminates the necessity of providing any packing glands, packings, stuffing nuts, bonnets or bearings for such stem and there is therefore no opportunity for the valve to leak through such a packing, bearing or otherwise. A further improvement of importance is the elimination of pockets wherein liquids might become entrapped. The valve can be used with nuclear fuels where they are manufactured, handled or reprocessed.

Straight line flow is one of the characteristics of this improved valve which has been designed with a minimum of restriction to the flow line. An economy of space has been effected because of this straight, in-line design. In addition to its capabilities as a shut-off valve, this improved version has been designed as a flow control valve, thus enlarging its scope of usefulness.

Traditionally, valves have been designed and constructed with one primary objective in mind, namely, the plugging or the unplugging of a hole. A novel means has been introduced in the present invention which reverses this time honored approach. Instead of plugging or unplugging the hole, this new in-line valve utilizes a movable seat while the plug remains stationary. Means for moving the seat as in opening or closing the valve are simple and effective. While the valve plug remains stationary, the valve seat, which has been incorporated into a simple, cylindrical sliding seat member, moves longitudinally along the valve's axis either toward, or away from the valve plug and in so doing, either closes or opens the valve.

The valve is simple in construction, rugged and foolproof and because of its simplicity, should be economical to produce. There is no possibility of misalignment between the valve plug and the valve seat. Because of the precise axial alignment in the movement of the valve seat and because of the substantial reduction in the number of components, it will be possible to incorporate heavy duty construction including the introduction of hardened and ground seats if necessary so that increased pressure may be utilized to ensure tight closure of the valve.

This valve is hermetically sealed and for this reason makes it useful in such fields as the manufacture and reprocessing of spent nuclear fuels, the manufacture and handling of liquefied gases, the petroleum industry including oil field use, and the distribution of highly toxic liquids. Equipped with hardened and ground seats, the valve should because of its ruggedness be able to accommodate slurries as the result of the pinching off action at the seat. This would make the valve acceptable in those cases where the usual rubber diaphragm valves have to be rejected because of rapid deterioration.

This invention does not attempt to incorporate any of the many possible methods of valve actuation since it will be readily seen that the valve will adapt itself with facility to numerous methods of operation whether by remote control through the use of solenoids, hydraulic or pneumatic devices, by gas pressure from the explosion of cartridge devices or manually by assistance from proper mechanical adjuncts. I have illustrated one simple means for operating the valve and this is by way of giving one example.

Other objects and advantages will appear as the specification continues. The novel features of the invention will be set forth in the appended claims.

Drawings

For a better understanding of my invention, reference should be made to the accompanying drawings, forming part of this specification, in which:

FIGURE 1 is a side elevation of the packingless in-line valve.

FIGURE 2 is a vertical longitudinal section taken axially along the valve shown in FIGURE 1. The valve operating mechanism of FIGURE 1 is not illustrated in FIGURE 2. The valve is shown in open position in FIGURE 2.

FIGURE 3 is a view similar to FIGURE 2 and illustrates the valve in closed position.

FIGURE 4 is a transverse section through the valve and is taken along the line 4—4 of FIGURE 2.

FIGURE 5 is an isometric view partly in section of the outer valve housing.

FIGURE 6 is an isometric view partly in section of the valve plug unit.

FIGURE 7 is an isometric view, partly in section of the sliding valve seat member.

FIGURE 8 is an isometric view partly in section illustrating a valve coupling member.

While I have shown only the preferred form of my invention, it should be understood that various changes, or modifications, may be made within the scope of the annexed claims without departing from the spirit thereof.

Detailed description

In carrying out my invention, I provide a valve housing indicated generally at A and shown in FIGURES 1 to 4 inclusive. This valve housing is cylindrical in form and can be made of any diameter and any length desired and from any material. At one end of the valve housing I mount a valve plug unit indicated generally at B. This valve plug unit is shown in section in FIGURES 2 and 3 and is shown in isometric section in FIGURE 6 with the plug 1 being illustrated in elevation.

The valve plug unit B comprises a cylindrical member 2 whose outer diameter is slightly less than the inner diameter of the valve housing A. The cylindrical member 2 has a portion projecting from the valve housing and the cylindrical member may be secured to the valve housing by any means desired such as by welding 3 shown in FIGURES 1, 2 and 3. The cylindrical member 2 has a central and longitudinally extending bore 4 and the valve plug 1 has its tapered end 1a received in the bore and centrally disposed therein. Vanes 5 are integral with the cylindrical portion and with the tapered or conical end 1a of the plug 1. The outer end of the plug 1 is made into a hemispherical portion 1b. If desired, the hemispherical portion 1b may be made of a hardened material. The outer end of the bore 4 of the cylindrical member 2 is enlarged and is internally threaded at 6.

A sliding valve seat member C is mounted within the outer housing A and its outer cylindrical surface is slightly less in diameter than the diameter of the inner cylindrical surface 7 of the valve housing A. The sliding valve seat member has diametrically opposed pins 8 and these are threaded at 8a and are received in threaded bores 9 provided in the sliding valve seat member C. The pins 8 project through longitudinally extending slots 10 provided in the valve housing A and are slidable in these slots. One or more pins 8 may be used and they may be disposed at any desired position around the member C. The number and positions of the slots 10 will agree with the number and positions of the pins 8.

In FIGURE 2, I show the pins 8 projecting beyond the outer surface of the valve housing A and any means desired, not shown, in this figure may be operatively connected to the pins so when this means is actuated the valve will be moved to open or closed position or to any other position between these two extremes. In FIGURE 1, I show the pins 8 having their outer ends lying flush with the outer surface of the valve housing A because in this FIGURE 1, there is illustrated by way of example one way for actuating the sliding valve seat member C.

It will be seen from FIGURE 1 that the housing A has an additional elongated slot 10a for receiving an additional pin 8. This pin can be moved in the slot 10a for moving the sliding valve seat member C into closed or open position. An arm D is pivotally secured to the outer surface of the valve housing A in FIGURE 1, by means of a pivot screw 11. The arm D has a cam slot 12 therein for slidably receiving the pin 8 that projects beyond the elongated slot 10a provided in the valve housing A. A grip 13 is mounted on the outer end of the arm D and may be moved for swinging the arm in a counter-clockwise direction about the pivot screw 11 as a pivot when looking at FIGURE 1. When the arm is in the position shown in the figure, the pin 8 that is received in the cam slot 12 will be disposed at the right hand end of the slot 10a and the valve will be in open position. The open position of the valve is illustrated in FIGURE 2. When the arm D is swung counter-clockwise about the pivot screw 11, the cam slot 12 in the arm will move the pin 8 to the left in the slot 10a. This movement will cause the valve to close and the closed position of the valve is illustrated in FIGURE 3. The arm D is illustrated as only one of a number of different mechanisms for opening and closing the valve.

Again referring to the sliding valve seat member C shown in FIGURES 2, 3 and 7, it will be noted that the member has a pasasge 14 whose wall has a portion shaped somewhat the same as the hemispherical end 1b of the valve plug. The passage 14 also has another wall portion that is shaped like the conical portion 1a of the plug. The passage 14 is considerably larger in diameter than the diameter of the hemispherical end 1b and the adjacent conical portion 1a. The hemispherical end of the plug 1b and the conical portion 1a form a streamlined plug that cooperates with the similarly shaped but larger passage 14 for forming a streamlined passage in the sliding valve seat member C that will offer little impedance to the flow of gas or fluid through the passage.

The sliding valve seat member C is also provided with a valve seat 15, see FIGURE 2, that has a hemispherical wall portion that is designed to seat against the end 1b of the plug 1 when the valve seat member C is moved into closed position with the plug as illustrated in FIGURE 3. It is possible to make the valve seat 15 of a hardened material or an insert, not shown, of a different material may be mounted in the member C to form the valve seat 15. A conical passage 16 leads from the right hand end of the sliding valve seat member C when looking at FIGURE 2 and this passage communicates with the opening in the valve seat 15. The shape of the passage through the valve seat member C composed of the combined passage 14, the valve seat 15 and the conical passage 16 is much like the shape of a venturi tube. It has been found that such a passage shape will offer little impedance to the flow of fluid therethrough.

In FIGURE 2, the pins 8 are shown as being carried by the valve seat member C and as extending through the elongated slots 10 in the valve housing A. The slots 10 are long enough to permit the sliding movement of the valve seat member C from fully opened position into fully closed position.

A valve coupling member E shown in FIGURES 2, 3 and 8 has an outer cylindrical surface which will be received in the inner cylindrical surface 7 of the valve housing A. A portion of the valve coupling member E projects beyond the right hand end of the housing and the member E may be secured to the housing by any means such as welding or solder 17. The valve coupling member has a central passage 18 and this passage is enlarged and threaded at 19 for receiving a fluid or gas conveying pipe, not shown. The valve plug unit B can also receive a pipe, not shown, in the enlarged threaded portion 6 of the bore or passage 4.

I provide novel means for hermetically sealing the sliding valve seat member C with the plug member B and with the valve coupling member E so that no gas or liquid flowing through those three valve parts can escape to the inner cylindrical surface 7 of the valve housing A and then escape to the atmosphere. This permanent sealing of the valve is true whether the valve is in open or closed position and is accomplished without using any packing for the moving parts. I provide a flexible cylindrical bellows F and place this over the plug 1 and between the inner end 20 of the valve plug unit B and the adjacent end 21 of the sliding valve seat member C, see FIGURES 2 and 3. The bellows may be made of any material desired and is shown by a single line in FIGURES 2 and 3 even though the bellows is shown in longitudinal section in these FIGURES. The end 22 of the bellows F is soldered or otherwise secured at 23 to the inner end 20 of the valve plug unit B. An hermetic seal is therefore provided between the left hand end of the bellows F and the right hand end of the member B. Any type of hermetic sealing may be used. The right hand end 24 of the bellows is soldered or otherwise secured at 25 to the adjacent end 21 of the sliding valve seat member C. Again, any type of hermetic sealing between the right hand end of the bellows F and the adjacent end of the valve seat member C may be used. The bellows F is shown expanded in FIGURE 2 when the valve is open and collapsed in FIGURE 3 when the valve is closed.

I also provide another flexible bellows G and this bellows is placed between the inner end 26 of the valve coupling member E and the adjacent end 27 of the sliding valve seat member C. The end 28 of the bellows G is soldered at 29 or otherwise secured to the adjacent end 26 of the member E. The other end 30 of the bellows G is soldered at 31 or otherwise secured to the adjacent end 27 of the sliding valve seat member C. The result is a hermetically sealed passage between the members C and E that can change in its overall length.

For example, the bellows G is shown collapsed in FIGURE 2 when the valve is opened and is shown expanded in FIGURE 3 when the valve is closed. FIGURE 4 illustrates the sliding valve seat member C as having longitudinally extending bleed passages 32 in the outer cylindrical surface of the member C. These bleed passages communicate with a space 33 that lies between the members B and C and is disposed outside of the bellows F and still within the valve housing A. The other space 34 lies between the members C and E and is outside of the bellows G and within the housing A.

In the assembling of the various parts of the valve, the bellows F has its ends hermetically sealed to the members B and C and the bellows G has its ends hermetically sealed to the members C and E. These assembled parts are then inserted into the valve housing A and are moved longitudinally in the housing until the member B projects a slight distance beyond the adjacent end of the housing A and the member E projects a slight distance beyond the other end of the housing. The assembled parts are then rotated within the housing A in order to align the threaded bores 9 in the member C with the longitudinal slots 10 in the housing A. The pins 8 are then inserted through the slots and are threaded into the bores 9. The member B may now be welded to the housing A by the welding 3 and member E may be secured to the housing by the welding 17.

All of the valve parts are now in proper position and form a rugged integrated valve assembly in which the bellows F and G are fully protected against accidential injury by the valve housing A. It is possible to secure the valve housing A to the members B and E without welding because this stage of the assembly need not produce a hermetic seal. The hermetic seal is provided between the members B, C and E. In cases where excessive pressures might be encountered, expandable braided wire-form enclosures, not shown, could enclose the bellows F and G to shield the bellows.

Although I have shown the valve plug unit B as comprising the cylindrical member 2 and plug 1 being interconnected by integral webs or vanes 5, these various parts might be formed separately and welded or otherwise suitably joined together without departing from the spirit of my invention. The number of vanes 5 can be changed and this would depend upon the valve size and the strength requirements. The plug 1 is shown streamlined in shape. Other shapes of plugs could be used which would be more or less streamlined.

The novel feature of the invention is that the valve seat moves with respect to the plug whereas in the normal valve the plug moves with respect to the valve seat. The ends of the bellows F and G are shown welded or silver soldered to the adjacent members B–C and C–E. The valve seat 15 is formed concentric with the longitudinal axis of the valve. If desired, the valve seat and its corresponding mating segment on the plug 1 may be hard faced or fitted with separate inserts without departing from the spirit of this invention. The diametrically opposed pressure equalizing passages 32 shown in FIGURES 4 and 7 permit air to flow between the spaces 33 and 34 that surround the bellows F and G respectively. This construction permits the ready flow of air from one passage into the other as the sliding valve seat member C is moved between closed and opened positions. Inasmuch as the plug 1 and the valve seat 15 may be made as rugged as necessary, almost any degree of closing pressure may be anticipated in the valve's construction, thus insuring a tight sealing in the valve.

I claim:
1. In a packingless in-line valve comprising:
   (a) a valve plug member having a plug and a fluid passage in the member;
   (b) a valve seat member having a fluid passage therein communicating with a valve seat;
   (c) a first flexible bellows enclosing said plug and having its ends connected to said members and communicating with the passages in said members; said bellows permitting said valve seat member to move toward said plug for causing the plug to seat in the valve seat;
   (d) a coupling having a fluid passage therein;
   (e) a second bellows having its ends connected to said valve seat member and to said coupling for placing the passages in these members in communication with each other;
   (f) a casing enclosing said valve seat member, said first and second bellows and parts of said valve plug member and said coupling, said valve seat member being free to move within said casing;
   (g) means for moving said valve seat member toward said plug for causing the latter to seat in the valve seat to close the valve, said means being adapted to move said valve seat member away from said plug for opening the valve, the first and second bellows permitting this movement;
   (h) the means for moving said valve seat member including pins projecting outwardly from said member; and
   (i) said casing having slots for slidably receiving said pins;
   (j) said first and second bellows making a liquid tight connection between said valve seat member and said valve plug member and said coupling for preventing any escape of fluid into said casing whether the valve is in open or closed position.

2. In a packingless in-line valve comprising:
   a cylindrical casing;
   a valve plug member fixedly mounted in one end of said casing;
   a valve coupling member fixedly mounted in the other end of said casing in spaced relation to said valve plug member, each of said valve plug member and valve coupling member having a longitudinally extending bore formed therein;
   a valve plug positioned in said casing and having one end connected to and carried by said valve plug member with the other end positioned in spaced relation to said valve coupling member;
   a valve seat member slidably mounted in said casing intermediate said valve plug member and said valve coupling member;
   said valve seat member having a fluid passage therethrough with a portion of said passage being in concentric relation with respect to said other end of said valve plug at all times, said valve seat member having a valve seat for engaging said other end of said valve plug;
   sealing means carried by said valve seat member and connected to said valve plug member and said valve coupling member for sealing said casing with respect to the bores formed in said valve plug member and valve coupling member and the passage in said seat member; and
   means for moving said valve seat member toward said valve plug member for causing said valve plug to engage said seat and close the valve and for unseating said valve plug upon moving said valve seat member toward said valve coupling member.

3. In packingless in-line valve as set forth in claim 2, wherein said sealing means are flexible bellows.

References Cited

UNITED STATES PATENTS

| 2,132,262 | 10/1938 | Gabriel | 251—159 X |
| 2,245,097 | 6/1941 | Tobler | 251—340 |
| 2,278,313 | 3/1942 | Hornbostel | 251—344 |
| 2,370,751 | 3/1945 | Prager | 251—159 |
| 2,606,631 | 8/1952 | Grooms | 251—319 X |
| 2,708,563 | 5/1955 | Backman et al. | 251—340 |
| 2,831,326 | 4/1958 | Richards et al. | 251—340 X |
| 2,905,433 | 9/1959 | Till et al. | 251—335 X |

FOREIGN PATENTS

| 568,730 | 7/1958 | Beguim. |
| 1,031,462 | 6/1958 | Germany. |
| 1,213,058 | 10/1959 | France. |
| 557,578 | 2/1957 | Italy. |
| 608,889 | 9/1960 | Italy. |

M. CARY NELSON, *Primary Examiner.*

S. SCOTT, *Assitant Examiner.*